(12) United States Patent
Lewis

(10) Patent No.: US 8,958,493 B2
(45) Date of Patent: Feb. 17, 2015

(54) OPERATION FOR BACKWARD-COMPATIBLE TRANSMISSION

(75) Inventor: Michael Lewis, Märsta (SE)

(73) Assignee: Infineon Technologies AG, Neubiberg (DE)

( * ) Notice: Subject to any disclaimer, the term of this patent is extended or adjusted under 35 U.S.C. 154(b) by 3191 days.

(21) Appl. No.: 11/089,284

(22) Filed: Mar. 24, 2005

(65) Prior Publication Data

US 2005/0220209 A1    Oct. 6, 2005

Related U.S. Application Data

(60) Provisional application No. 60/558,220, filed on Mar. 31, 2004.

(51) Int. Cl.
| | | |
|---|---|---|
| *H04B 7/02* | (2006.01) | |
| *H03K 9/00* | (2006.01) | |
| *H04J 11/00* | (2006.01) | |
| *H03C 7/02* | (2006.01) | |
| *H04B 1/10* | (2006.01) | |
| *H04L 25/02* | (2006.01) | |
| *H04L 1/00* | (2006.01) | |
| *H04L 1/06* | (2006.01) | |
| *H04L 5/00* | (2006.01) | |
| *H04L 5/14* | (2006.01) | |

(52) U.S. Cl.
CPC .......... *H04L 25/0204* (2013.01); *H04L 1/0002* (2013.01); *H04L 1/0618* (2013.01); *H04L 5/0023* (2013.01); *H04L 5/0048* (2013.01); *H04L 5/1446* (2013.01); *H04L 25/0226* (2013.01); *H04L 25/025* (2013.01); *H04L 25/022* (2013.01)

USPC .......... 375/267; 375/225; 375/295; 375/316; 370/208; 455/101; 455/303

(58) Field of Classification Search
CPC . H03M 13/09; H03M 13/03; H03M 13/3707; H03M 13/6502; H03M 13/11; H03M 13/2927; H03M 13/4161
USPC .................. 375/267, 225, 295, 316; 370/208; 455/101, 303
See application file for complete search history.

(56) References Cited

U.S. PATENT DOCUMENTS 5,907,583 A * 5/1999 Sakoda et al. ................ 375/260
5,991,273 A   11/1999 Abu-Dayyya
6,473,393 B1 * 10/2002 Ariyavisitakul et al. ..... 370/203

(Continued)

FOREIGN PATENT DOCUMENTS

| EP | 1 170 897 A1 | 1/2002 |
|---|---|---|
| WO | WO 03/034644 A1 | 4/2003 |
| WO | WO 03/034646 A2 | 4/2003 |

*Primary Examiner* — Chieh M Fan
*Assistant Examiner* — Sarah Hassan
(74) *Attorney, Agent, or Firm* — Eschweiler & Associates, LLC

(57) ABSTRACT

The present invention relates to a transmitter in a transmission system operable to optimize estimates of a quantity at a receiver for improved operation. The transmission system includes a transmitting unit connected to a number of antennas (Txm), and to control unit. The control unit controls the transmitting unit to initially transmit an initial training/quantity estimation sequence during an initial training/quantity estimation phase and subsequently transmit a sequence of data symbols such that the information rate of the data symbols is progressively increased.

14 Claims, 16 Drawing Sheets

(56) References Cited

U.S. PATENT DOCUMENTS

| | | | |
|---|---|---|---|
| 6,667,961 B1* | 12/2003 | Park et al. | 370/331 |
| 6,711,412 B1* | 3/2004 | Tellado et al. | 455/506 |
| 2001/0053143 A1* | 12/2001 | Li et al. | 370/344 |
| 2002/0041635 A1* | 4/2002 | Ma et al. | 375/267 |
| 2002/0122382 A1 | 9/2002 | Ma et al. | |
| 2003/0125040 A1* | 7/2003 | Walton et al. | 455/454 |
| 2004/0081074 A1* | 4/2004 | Piechocki | 370/206 |
| 2005/0233709 A1* | 10/2005 | Gardner et al. | 455/101 |

* cited by examiner

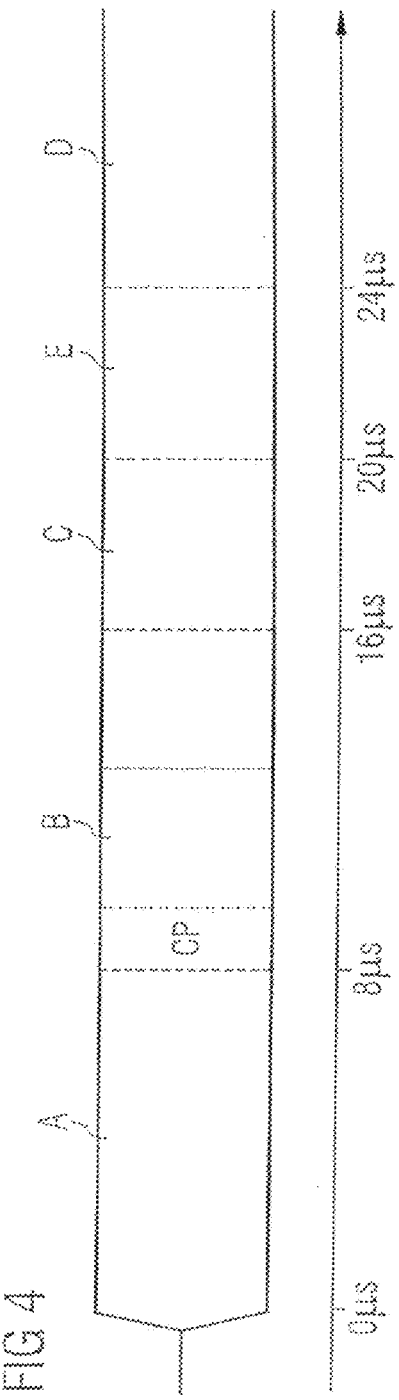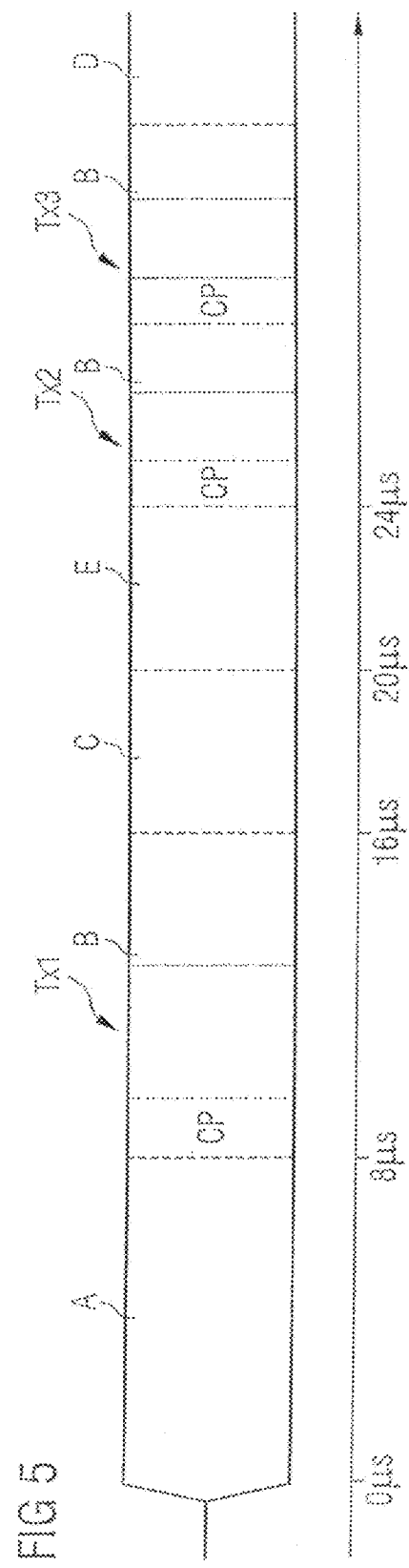

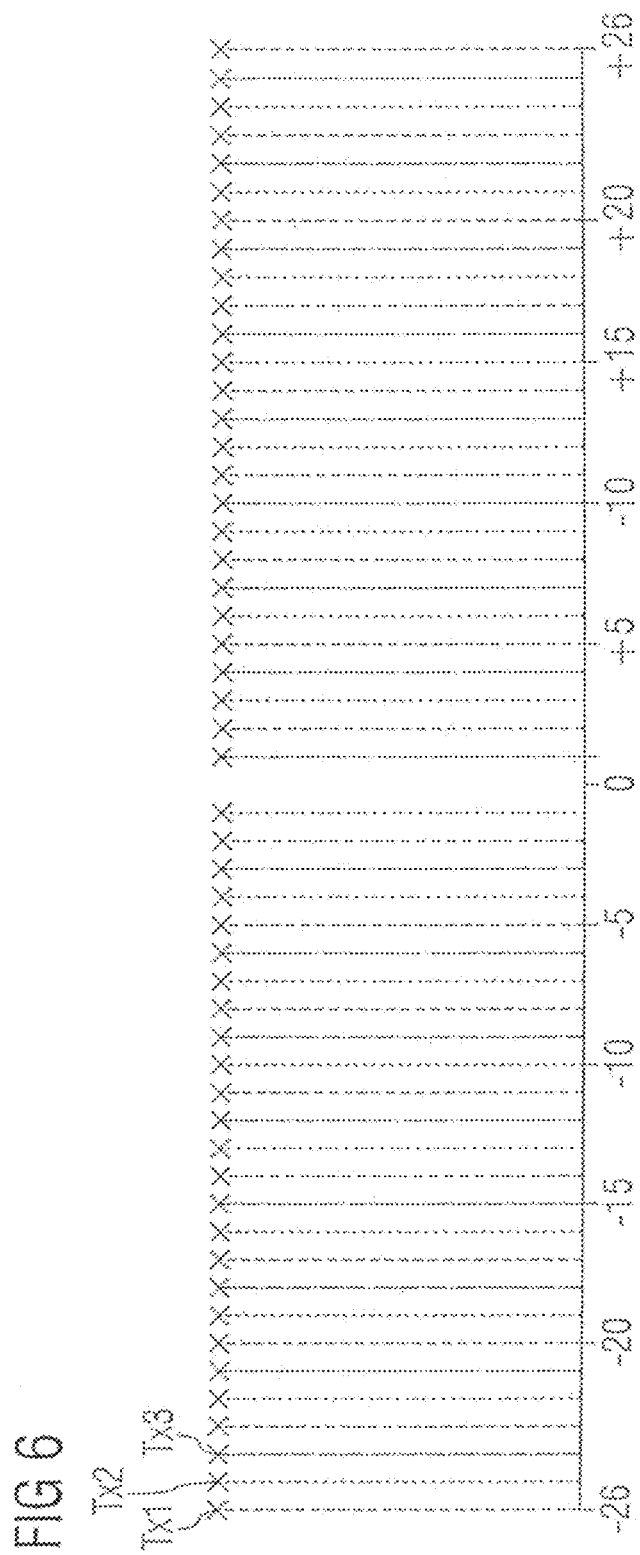

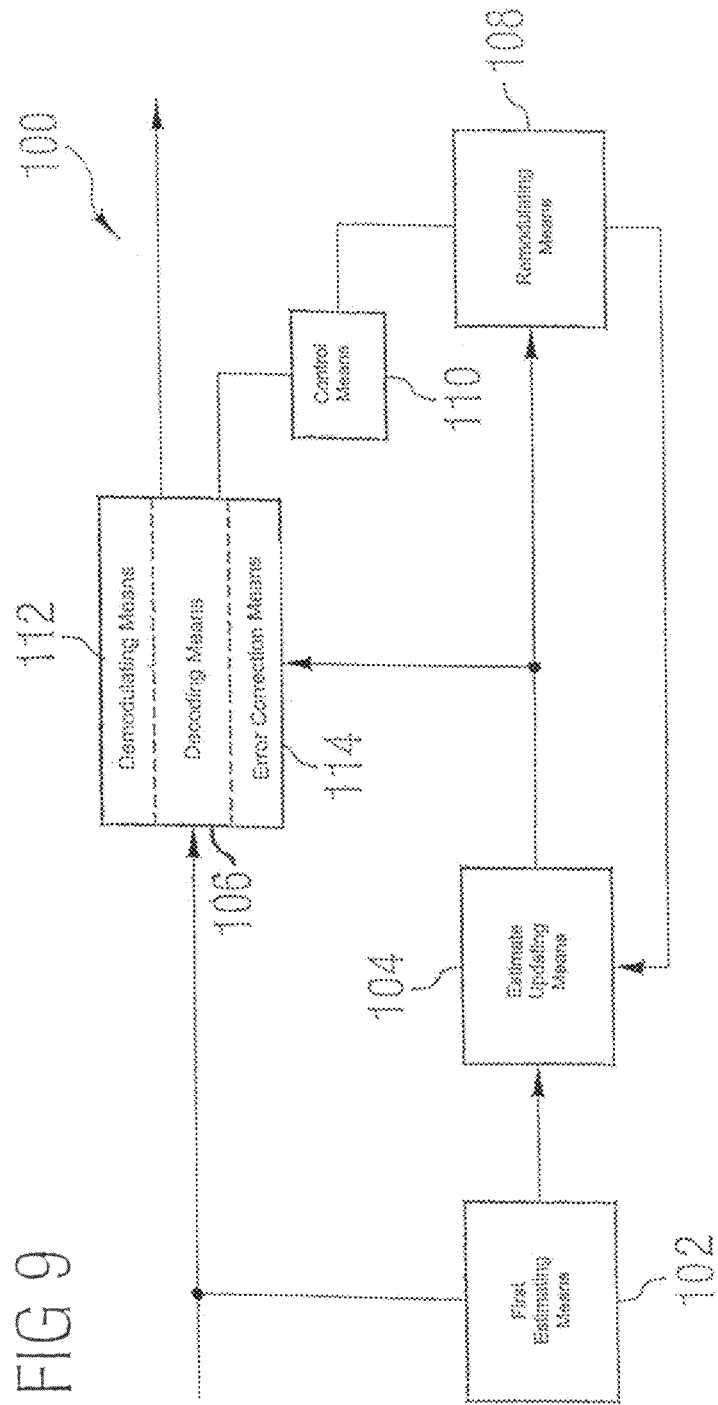

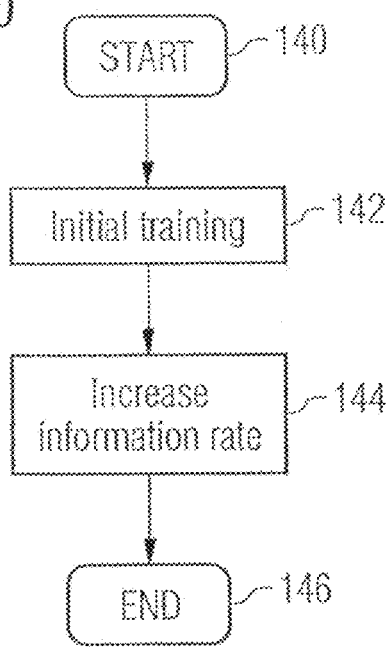
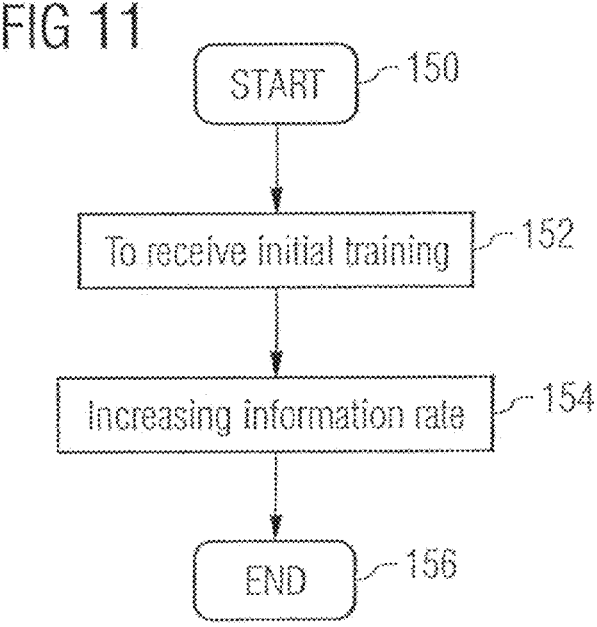

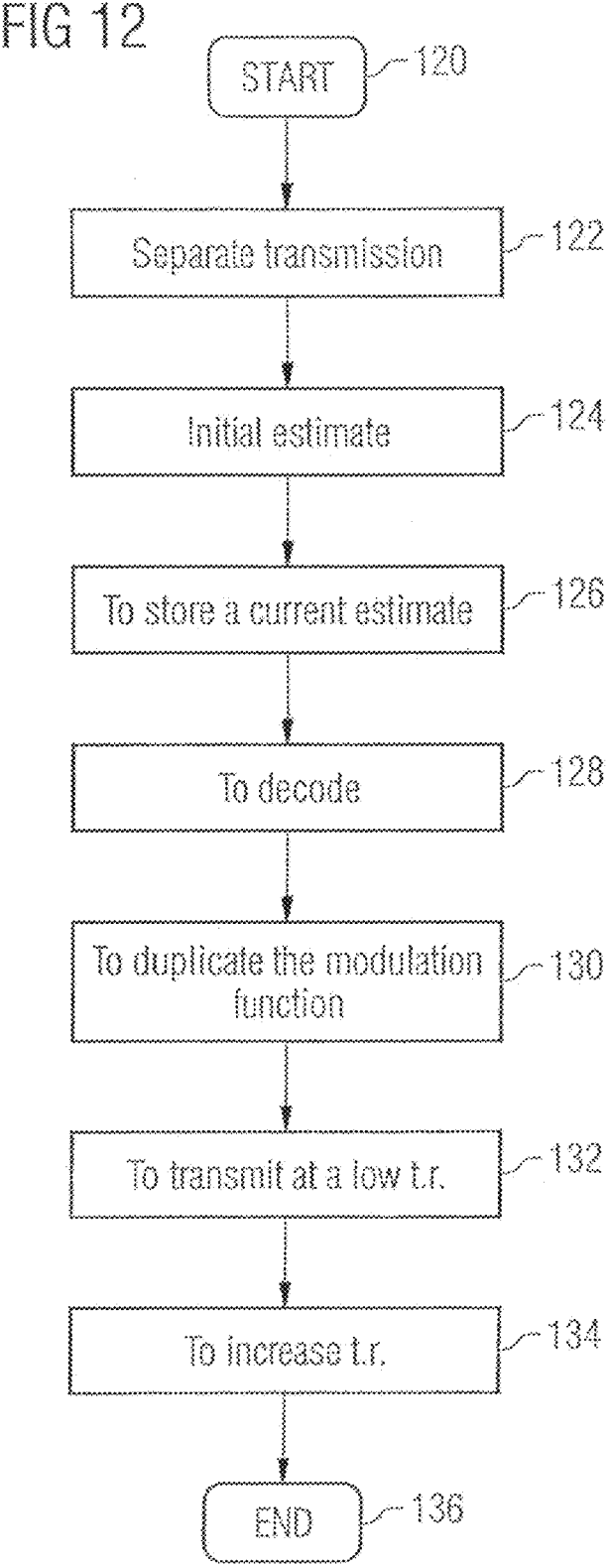

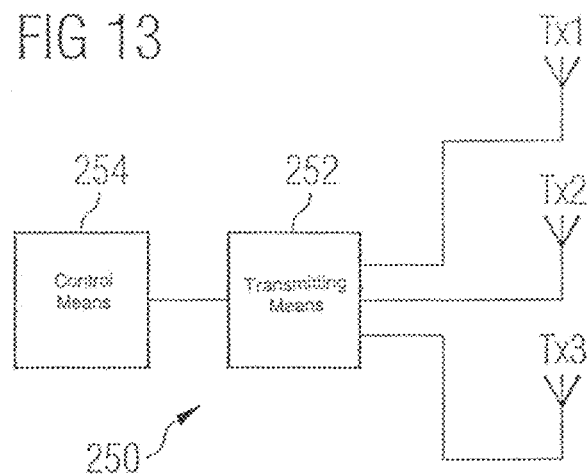
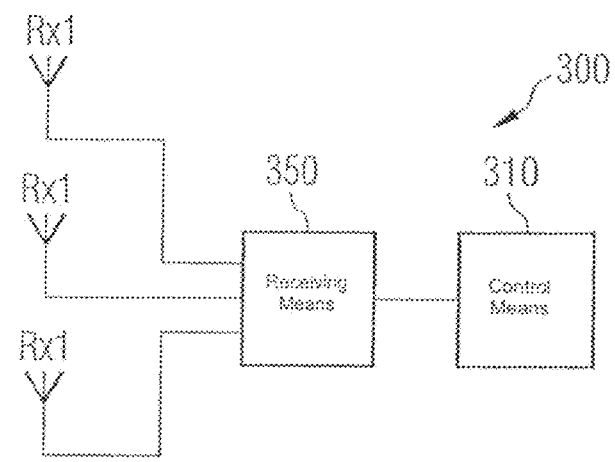

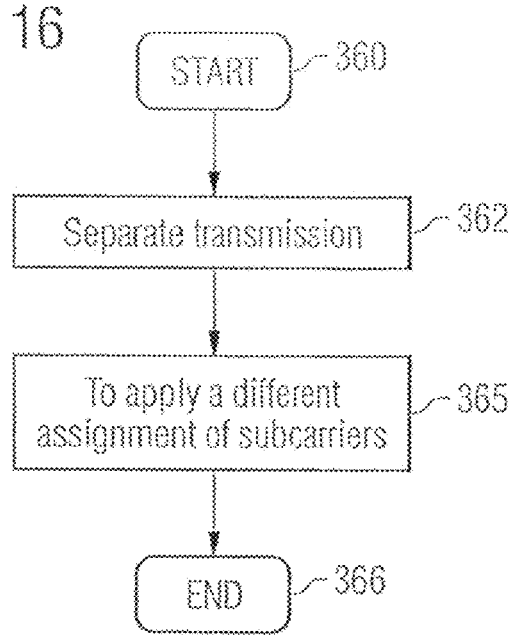
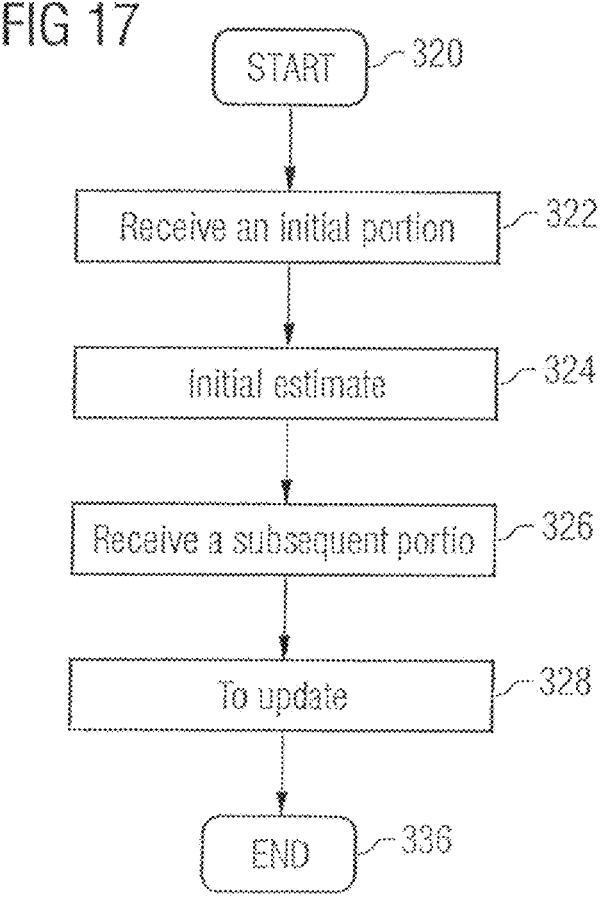

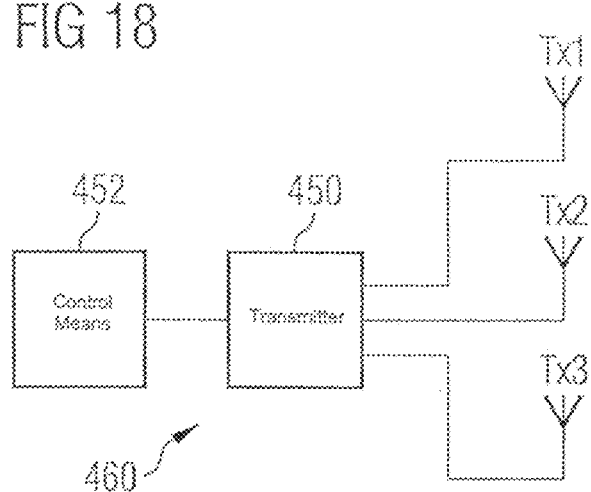
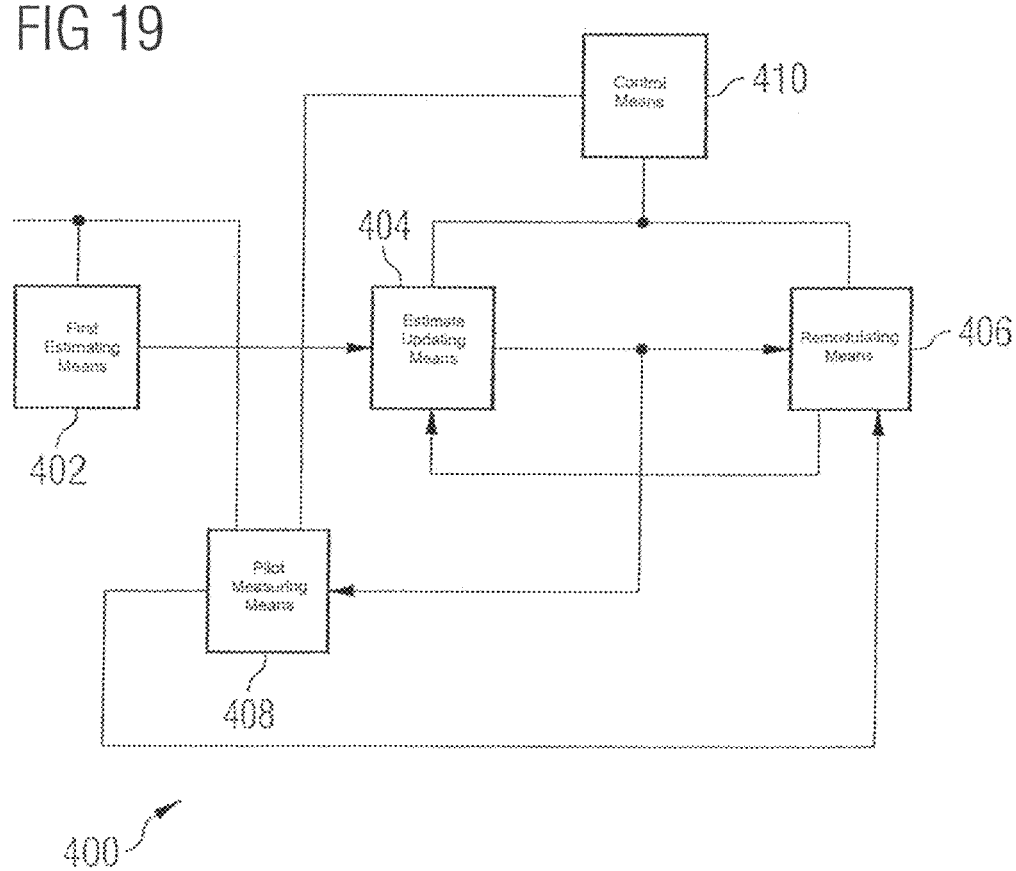

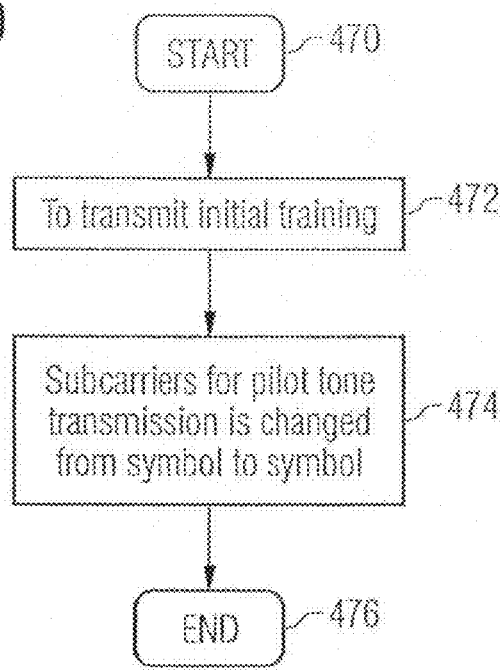
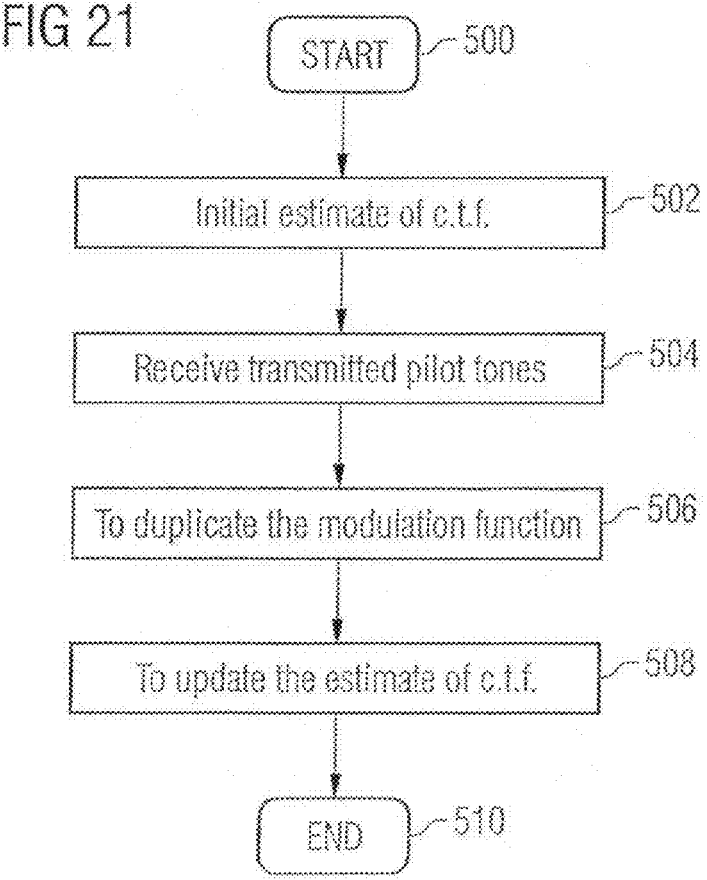

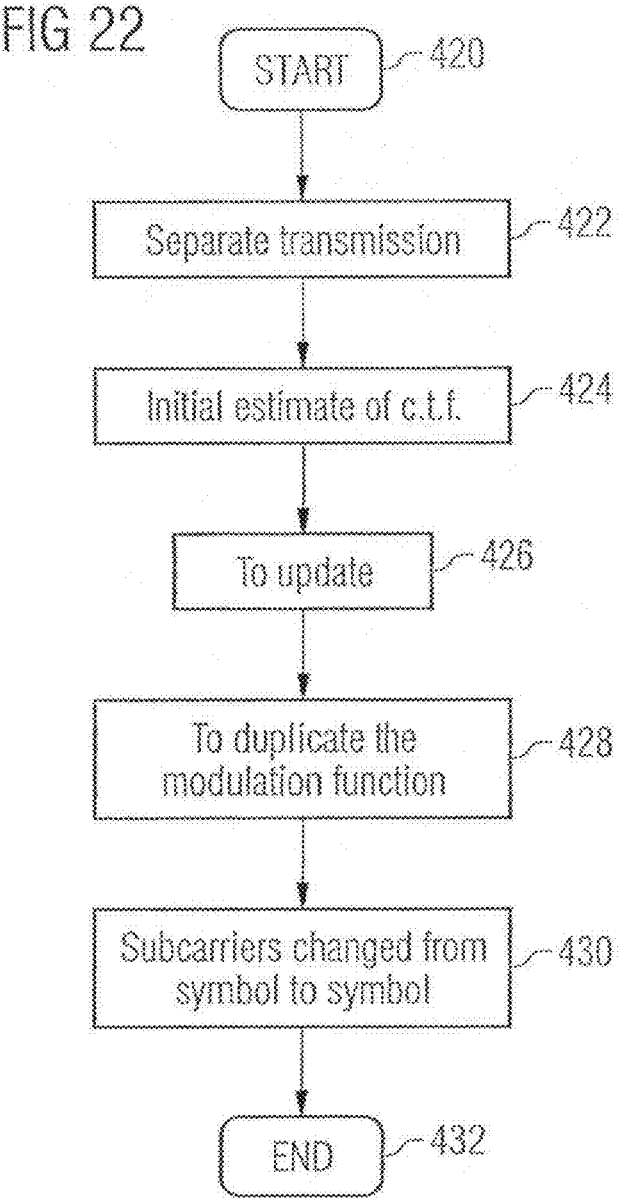

FIG 24
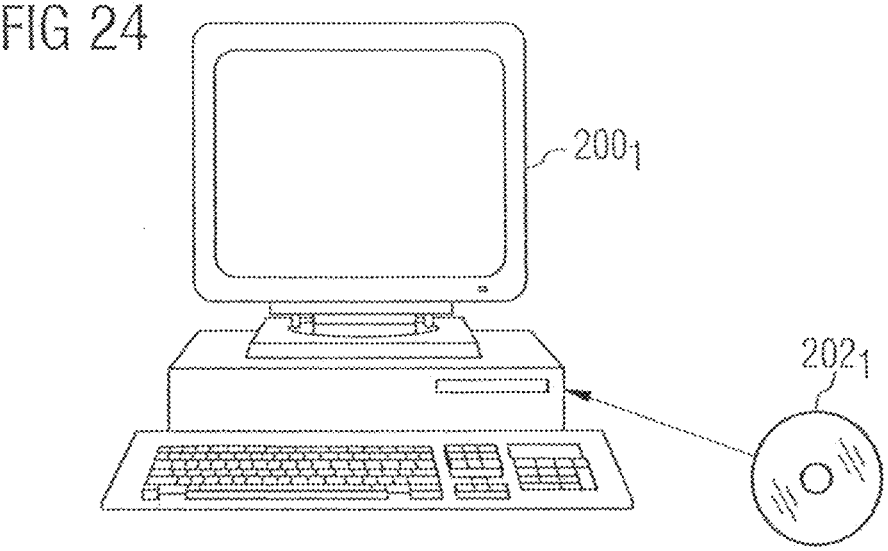
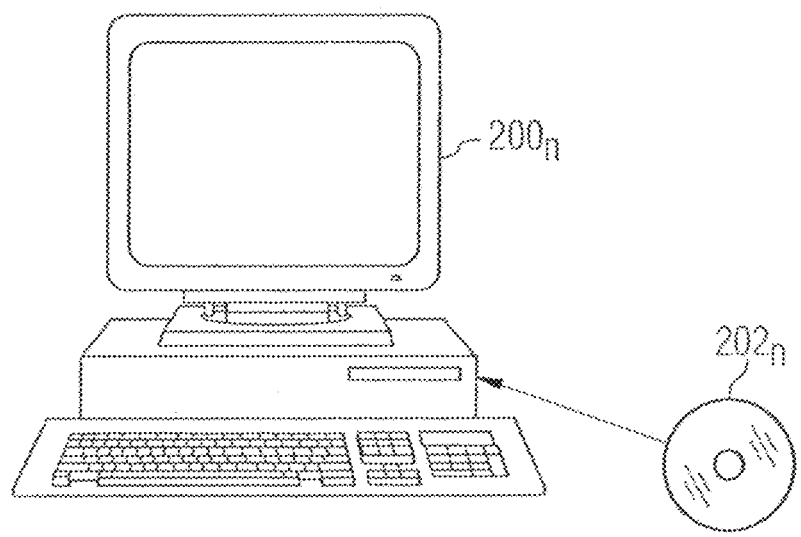

OPERATION FOR BACKWARD-COMPATIBLE TRANSMISSION

REFERENCE TO RELATED APPLICATIONS

This application claims priority to and the benefit of Provisional Application No. 60/558,220, filed on Mar. 31, 2004, the contents of which are herein incorporated by reference in its entirety.

FIELD OF THE INVENTION

The present invention relates to transmission systems operable to optimize estimates of a quantity at a receiver, and associated methods.

BACKGROUND OF THE INVENTION

The IEEE 802.11 wireless LAN standardisation process recently created the "high throughput" task group, which aims to generate a new standard for wireless LAN systems with a measured throughput of greater than 100 Mbit/s. The dominant technology that promises to be able to deliver these increased speeds are so-called MIMO (multiple-input, multiple-output) systems. MIMO systems are defined by having multiple antennae used for both transmission and reception. The maximum theoretical throughput of such a system scales linearly with the number of antennae, which is the reason that the technology is of great interest for high throughput applications. An example of such a system is shown in FIG. 1, with a laptop 2 transmitting to an access point where each device has three antennae.

The reason why these systems can offer improved throughput compared to single antenna systems, is that there is spatial redundancy: each piece of information transmitted from each transmitting antenna travels a different path to each receiving antenna, and experiences distortion with different characteristics (different channel transfer functions). In the example of FIG. 1, there are three different channel transfer functions from each antenna to each receiver: the transfer function from transmitting antenna x to receiving antenna y is denoted by $H_{xy}$. Greater capacity is obtained by making use of the spatial redundancy of these independent or semi-independent channels (perhaps in conjunction with other coding techniques) to improve the chance of successfully decoding the transmitted data. The examples given here use three transmitting antennae. However, any arbitrary number of transmit antennae can be used.

There are a wide range of published techniques for encoding information over a MIMO channel set, for example, linear beamforming with a Wiener filter receiver, space time block coding, etc. In virtually all of the techniques, it is necessary to obtain a reasonably accurate estimate of the channel transfer functions at least at the receiver. In some of the techniques, channel transfer function estimates must also be available at the transmitter: it is possible to encode the estimated transfer function at the receiver and send it back to the transmitter if the channel transfer functions change sufficiently slowly with time.

An important criterion of the high-throughput WLAN standardisation activity is that the new systems can interoperate with existing 802.11a and 802.11g OFDM WLAN systems. This means, primarily, that the legacy systems can interpret sufficient information from the transmission of the new system such that they do not interact in a negative manner (e.g., making sure that legacy systems remain silent during an ongoing transmission of the new system). For this reason, it has been proposed that the new high-throughput standard uses the same preamble structure as for 802.11a/g. The preamble is the information transmitted before the data-carrying portion of a transmission, which allows the transmission to be detected and allows estimation of, amongst other things, the channel transfer function. The aim is that the transmitted preambles will be sufficiently similar so that legacy devices can determine the presence and duration of a high-throughput transmission.

A representation of an IEEE 802.11a/g OFDM preamble is shown in FIG. 2. The first portion of the preamble consists of 10 repetitions of a short 0.8 µs long sequence known as the short preamble symbol A. These are used to detect the presence of an incoming signal and to perform initial estimations of, for example, carrier frequency offset.

The second portion B of the preamble uses the same sort of transmission as the OFDM symbols that are used to carry data in the payload of the transmission. The symbols are 3.2 µs long, and are made up of 52 subcarriers with a spacing of 0.3125 MHz, as shown in FIG. 3. The preamble consists of 2 repetitions of a known 3.2 µs training symbol, preceded by a 1.6 µs cyclic prefix (a copy of the last half of a training symbol prepended to the sequence). These OFDM training symbols are used to perform an estimate of the channel transfer function from the transmitting antenna to each receiving antenna. The cyclic prefix CP means that each OFDM subcarrier experiences a flat fading channel (for sufficiently short channel delay spreads). Flat fading means that the channel transfer function for the signal on each subcarrier can be represented purely by a phase rotation and a scaling of amplitude. These amplitude and phase changes for each subcarrier can readily be estimated when the received signal is transformed into the frequency domain (e.g., via the FFT).

The final portion of the preamble, known as the SIGNAL field C, is a single OFDM data symbol (3.2 µs long with a 0.8 µs cyclic prefix) modulated using BPSK, the most robust transmission mode defined in the standard. This contains details of what modulation format is used for the rest of the transmission, as well as the overall length of the transmission.

D represents the data symbols.

There are two primary difficulties in implementing a MIMO system that is interoperable with legacy 11a/11g devices. Firstly, it is necessary to be able to signal that the new MIMO transmission methods are being used while also allowing legacy devices to gather sufficient information of the transmission in progress. This can be done in a straightforward manner: there are unused portions of the 802.11a/11g SIGNAL field, which are defined as reserved (not used in transmission, and ignored on reception). These portions can be used to flag the use of a new transmission mode, while the rate and length information contained in the SIGNAL field can be used to indicate the duration of the transmission. For MIMO devices, this first signal field can then be followed by another signal field, shown in FIG. 4 with the second signal field denoted as SIGNAL2, E.

These portions of the preamble structures in FIGS. 2 and 4, which correspond to each other, have been denoted with the same reference letter.

The legacy device will thereby interpret the SIGNAL C field correctly (ignoring the reserved sections): the remainder of the frame will not be correctly received, but the legacy device will recognise that a transmission is underway and know what the duration of the transmission is. A non-legacy device will interpret both SIGNAL, C and SIGNAL2, E, using the SIGNAL2 field, E to configure the operating mode for the remainder of the transmission (perhaps in conjunction with information from the SIGNAL field C).

A more complicated problem is the task of creating the estimates of the channel transfer function from each transmitting antenna to each receiving antenna. Techniques exists whereby the transfer function at the receiver can be estimated with transmission occurring on all antennae simultaneously; however, these techniques are not compatible with the existing 11a/11g preamble structure. The alternative is that transmissions on each antenna are separated, in time and/or in frequency.

Probably the simplest way to generate channel estimates for each transmit antenna is to separate the transmissions in time. The initial preamble is transmitted on a single antenna. This will allow legacy devices to receive the preamble, and will allow MIMO devices to estimate the channel transfer function from the first transmitting antenna to each receiving antenna. Subsequently, long training symbols can be repeated on each of the other transmit antennae, allowing the channel transfer functions to be estimated from each of the remaining transmit antennae to each receive antenna.

An example of one possible preamble structure using this method is shown in FIG. 5. Here, everything up to the SIGNAL2 field are transmitted on antenna 1, and antennae 2 and 3 then transmit copies of the training sequence (the chosen order of the training sequences and the SIGNAL2 field is unimportant, as long as it is standardised).

An alternative to separating the transmissions in time is to separate the transmissions on each antenna in frequency, so that a given antenna is the only one transmitting on a given subcarrier at a given time, and to use the standard 802.11a/g preamble. An example of a possible distribution is shown in FIG. 6. The subcarrier/Tx antenna distribution can either be used for the whole preamble, or can be used for the long training symbols and the SIGNAL/SIGNAL2 fields only. The channel spacing is 0.3125 MHz.

From the point of view of a legacy device, there is a unique transfer function for each subcarrier that can be estimated that remains constant through to the SIGNAL field and allows the required information to be decoded.

For a MIMO device, the channel transfer functions are not completely known for all subcarriers for each transmitting antenna. It is therefore necessary to exploit the characteristics of the physical channel, whereby nearby subcarriers have a channel transfer function that is correlated with one another. It is therefore possible to make an estimate of the unknown subcarriers interpolated or extrapolated from the nearby subcarriers.

Multiple training symbols give an unambiguous and good-quality estimate for the channel transfer functions. However, they represent a significant overhead (an extra 20 μs per packet). Since the aim of the MIMO system is to provide very greatly increased throughput, this overhead becomes the limiting factor in determining the available transmission rate and fails to meet the required target of 100 Mbps.

The use of the diagonal channel estimate offers a minimal overhead. However, the requirement to interpolate/extrapolate the channel transfer functions causes problems, particularly for difficult channels, due to errors in the resulting estimates. Such channel estimation errors are irreducible (increasing signal power does not improve the situation), and are likely to be a limit to the available data rate. The problem is particularly bad for the subcarriers at the edge of the band, for which extrapolation must be performed (since a known subcarrier channel transfer function exists only on one side).

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof. Rather, the primary purpose of the summary is to present some concepts of the invention in a simplified form as a prelude to the more detailed description that is presented later.

The present invention is directed to systems and methods that solve the above-mentioned problems. A transmitter in a transmission system according to the invention is operable to optimize estimates of a quantity at a receiver for improved operation. The transmission system comprises, in one example, a transmitting means connected to a number of antennas, and a control means. The control means controls the transmitting means to initially transmit an initial training/quantity estimation sequence during an initial training/quantity estimation phase and subsequently transmit a sequence of data symbols such that the information rate of the data symbols is progressively increased.

One advantage of the transmitter according to the above embodiment is that it provides an improved trade-off between initial quantity estimation error and the amount of overhead introduced, thereby allowing higher final rates for a given probability of packet error at a receiver, which is able to update the quantity estimates based on the received data.

In another embodiment of the invention, an optimization system is provided. The optimization system is operable to optimize estimates of a quantity at a receiver for improved operation. The optimization system comprises a receiving means connected to a number of receiving antennas, and to control means. The control means controls the receiving means to initially receive an initial training/quantity estimation sequence during an initial training/quantity estimation phase and subsequently receive a sequence of data symbols such that the information rate of the data symbols is progressively increased.

One advantage of the optimization system according to one embodiment of the invention is that it provides an improved trade-off between initial quantity estimation error and the amount of overhead introduced, thereby allowing higher final rates for a given probability of packet error at a receiver, which is able to update the quantity estimates based on the received data.

The invention also comprises a method at a transmitter that facilitates an optimization of estimates of a quantity at a receiver. In one embodiment, the method comprises transmitting an initial training/quantity estimation sequence, and transmitting the first few data symbols of the remainder of the transmission at a low information rate and increasing the information rate progressively with time.

One advantage of this method is that it provides an improved trade-off between initial quantity estimation error and the amount of overhead introduced, thereby allowing higher final rates for a given probability of packet error at a receiver, which is able to update the quantity estimates based on the received data.

In accordance with another embodiment of the invention, at least one computer program product is provided, wherein the at least one computer program product performs the transmissions in the above-highlighted method and consequently achieves the same advantage.

A method for optimization of estimates of a quantity at a receiver is also provided and comprises receiving an initial training/quantity estimation sequence during an initial training/quantity estimation phase, and adapting the receiver to an increasing information rate used at the transmitter.

One advantage of the above method is that it provides an improved trade-off between initial quantity estimation error and the amount of overhead introduced, thereby allowing higher final rates for a given probability of packet error.

In accordance with another embodiment of the invention, a transmitter in a transmission system is provided, wherein the transmitter is operable to optimize estimates of a channel transfer function at a receiver for improved operation for backward-compatible multiple input multiple output (MIMO) OFDM-based wireless LAN networks. The transmission system comprises m number of transmitting antennas and n number of receiving antennas, wherein m an n are integers and m, n≥2. The transmissions on each transmitting antenna during an initial training/channel estimation phase are separated in frequency, so that a given transmitting antenna is the only one transmitting on a given subcarrier at a given time. The transmission system further comprises a transmitting means connected to a number of antenna means. The transmission system also comprises a control means connected to said transmitting means and is operable to control the transmissions in such a way that a different assignment of subcarriers to transmitting antennas is made for later portions of the training/estimation sequence than for the initial portion of the training/estimation sequence containing the 11a/11g SIGNAL field.

An advantage with the above transmission system according to this exemplary embodiment of the present invention is that it provides improved channel estimates without any overhead.

An optimization system according to another embodiment of the invention is operable to optimize estimates of a channel transfer function at a receiver for improved operation for backward-compatible multiple input multiple output (MIMO) OFDM-based wireless LAN networks. The optimization system comprises m number of transmitting antennas and n number of receiving antennas, wherein m an n are integers and m, n≥2. The transmissions on each transmitting antenna during an initial training/channel estimation phase are separated in frequency, so that a given transmitting antenna is the only one transmitting on a given subcarrier at a given time. The optimization system comprises a receiving means connected to receiving antenna, and to a control means operable to adapt an estimate updating process to a different subcarrier to transmitting antenna mapping during later portions of the training/estimation sequence than for the initial portion of the training/estimation sequence containing the 11a/11g SIGNAL field.

An advantage of the above optimization system embodiment is that it provides improved channel estimates without any overhead.

In accordance with yet another embodiment of the invention, a method is disclosed for optimising estimates of channel transfer functions at a receiver for improved operation for backward-compatible multiple input multiple output (MIMO) OFDM-based wireless LAN networks. The method comprises m number of transmitting antennas and n number of receiving antennas, wherein m an n are integers and m, n≥2, and comprises separating the transmissions on each transmitting antenna in frequency during an initial training/channel estimation phase, so that a given transmitting antenna is the only one transmitting on a given subcarrier at a time. The method further comprises applying a different assignment of subcarriers to transmitting antennas for the later portions of the training/channel estimation sequence than for the initial portion containing the 11a/11g SIGNAL field. One advantage with this method is that it provides improved channel estimates without any overhead.

In still another embodiment, a method is disclosed for optimising estimates of channel transfer functions at a receiver for improved operation backward-compatible multiple input multiple output (MIMO) OFDM-based wireless LAN networks. The method comprises m number of transmitting antennas and n number of receiving antennas, wherein m an n are integers and m, n≥2, and comprises receiving an initial portion of the training/estimation sequence containing the 11a/11g SIGNAL field, and obtaining an initial estimate of the channel transfer function during the initial portion of the training/estimation sequence containing the 11a/11g SIGNAL field. The method further comprises receiving a subsequent portion of the training/estimation sequence where the mapping of subcarriers to transmit antennae is changed, and updating the initial estimate of the channel transfer function. One advantage with this method is that it provides improved channel estimates without any overhead.

In another embodiment a transmitter in a transmission system is provided and is operable to optimize estimates of channel transfer functions at a receiver for improved operation for backward-compatible multiple input multiple output (MIMO) OFDM-based wireless LAN networks. The system comprises m number of transmitting antennas and n number of receiving antennas, wherein m an n are integers and m, n≥2. The transmitter comprises a transmission means capable of transmitting on a number of antennas and a control means, which is operable to control transmissions in such a way that the subcarriers used for a pilot tone transmission is changed from symbol to symbol.

One advantage with the above transmitter is that it allows channel estimates to be improved without the risk of data decoding errors, and gives the additional benefit of making pilot transmission more robust to deep fading or interference on particular subcarrier frequencies.

A receiver according to yet another embodiment of the invention comprises a receiver in a transmission system that is operable to optimize estimates of channel transfer functions at said receiver for improved operation for backward-compatible multiple input multiple output (MIMO) OFDM-based wireless LAN networks. The system comprises m number of transmitting antennas and n number of receiving antennas, wherein m an n are integers and m, n≥2. The receiver comprises a first estimating means operable to make an initial estimate of said channel transfer function, based on the received symbols during an initial training/channel estimation phase. The receiver also comprises estimate updating means operable to update said estimate of said channel transfer function, and remodulating means operable to duplicate the modulation function performed at the transmitter. The receiver also comprises pilot measuring means and a control means connected to said pilot measuring means, said estimate updating means and said remodulating means, wherein the control means is operable to control the pilot measuring means such that the subcarriers used for a pilot tone reception are changed from symbol to symbol.

An advantage with the above receiver is that it allows channel estimates to be improved without the risk of data decoding errors, and gives the additional benefit of making pilot transmission more robust to deep fading or interference on particular subcarrier frequencies.

According to still another embodiment of the invention, a method at a transmitter is provided that facilitates optimized estimates of channel transfer functions at a receiver for improved operation for backward-compatible multiple input multiple output (MIMO) OFDM-based wireless LAN networks. The method comprises transmitting an initial training/channel estimating sequence during an initial training/channel estimation phase, and controlling transmissions in subsequent data symbols in such a way that the subcarriers used for a pilot tone transmission are changed from symbol to symbol.

An advantage with this method is that it allows channel estimates to be improved without the risk of data decoding errors, and gives the additional benefit of making pilot transmission more robust to deep fading or interference on particular subcarrier frequencies.

In another embodiment, a method at a receiver is disclosed for producing optimized estimates of channel transfer functions for improved operation in a multiple input multiple output (MIMO) OFDM-based wireless LAN networks. The method comprises making an initial estimate of said channel transfer function, based on the received symbols during said initial training/channel estimating phase, and receiving the transmitted pilot tones from the subcarriers used at the transmitter. The method further comprises duplicating the modulation function performed at the transmitter, and updating the estimate of said channel transfer function using the received pilot tones.

An advantage with this method is that it allows channel estimates to be improved without the risk of data decoding errors, and gives the additional benefit of making pilot transmission more robust to deep fading or interference on particular subcarrier frequencies.

To the accomplishment of the foregoing and related ends, the invention comprises the features hereinafter fully described and particularly pointed out in the claims. The following description and the annexed drawings set forth in detail certain illustrative aspects and implementations of the invention. These are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The present invention will in the following by way of embodiments be described in more detail, in conjunction with the enclosed drawings, in which:

FIG. 4 shows an OFDM preamble structure with a second SIGNAL field (SIGNAL2);

FIG. 5 discloses a 11a/g compatible OFDM-MIMO preamble with replicated training sequences;

FIG. 6 shows a distribution of subcarriers over transmit antennas for diagonal channel estimation;

FIG. 9 is a block diagram of the optimization system disclosed in FIG. 8 in more detail;

FIG. 10 is a flow chart of a first embodiment of a method at a transmitter according to the present invention;

FIG. 11 is a flow chart of a first embodiment of a method for optimization according to the present invention;

FIG. 12 is a flow chart of the method disclosed in FIG. 11 in more detail;

FIG. 13 is a block diagram of a second embodiment of a transmitter according to the present invention;

FIG. 14 is a block diagram of a second embodiment of an optimization system according to the present invention;

FIG. 16 is a flow chart of a second embodiment of a method at a transmitter according to the present invention, FIG. 17 is a flow chart of a second embodiment of a method for optimising according to the present invention;

FIG. 18 is a block diagram of a third embodiment of a transmitter according to the present invention;

FIG. 19 is a block diagram of a receiver according to the present invention;

FIG. 20 is a flow chart of a third embodiment of a method at a transmitter according to the present invention;

FIG. 21 is a flow chart of a method at a receiver according to the present invention;

FIG. 22 is a flow chart of the method disclosed in FIG. 21 in more detail;

FIG. 24 show some examples of computer program products according to the present invention.

DETAILED DESCRIPTION OF THE INVENTION

Figure 1:
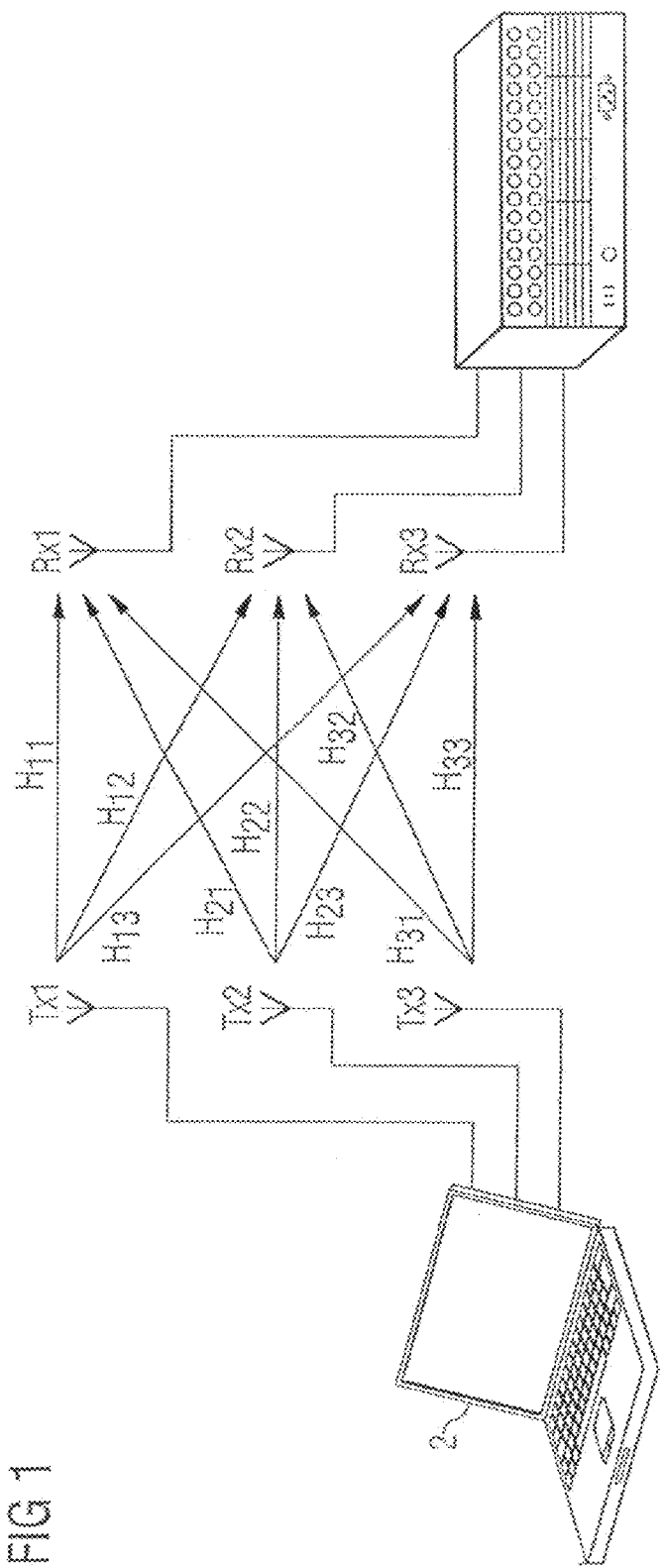
FIG. 1 is a diagram showing a MIMO system illustrating channel transfer functions between antennas.
Figure 2:
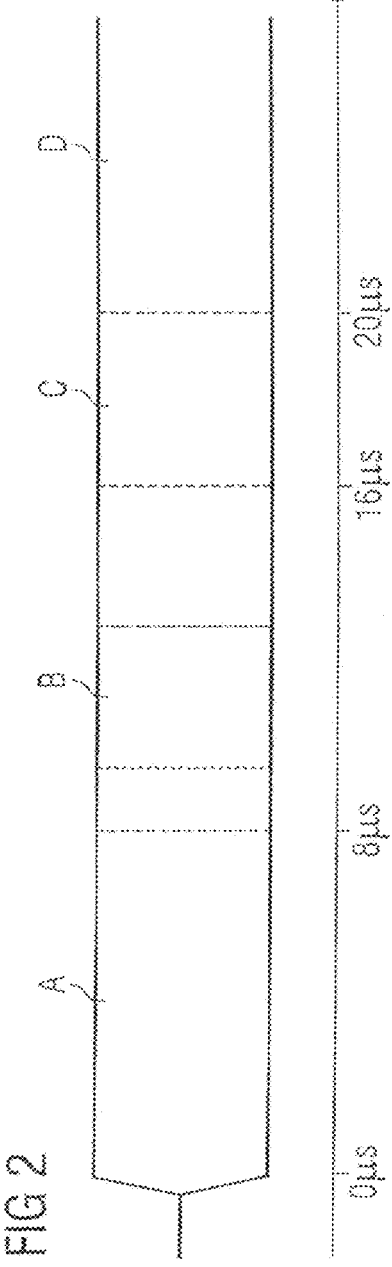
FIG. 2 shows an IEEE 802.11a/g OFDM preamble structure.
Figure 3:
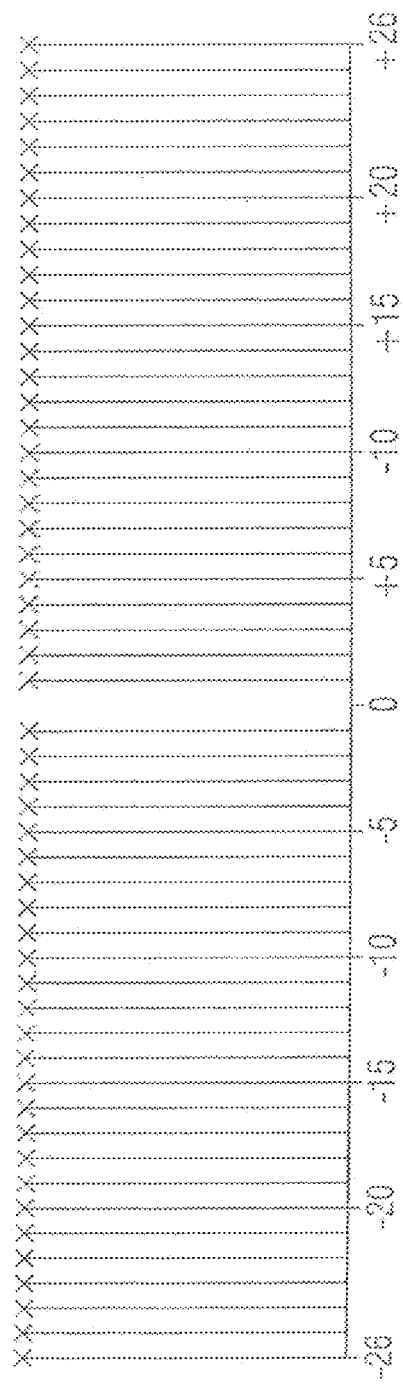
FIG. 3 discloses an OFDM subcarrier (frequency domain) structure.
Figure 7:
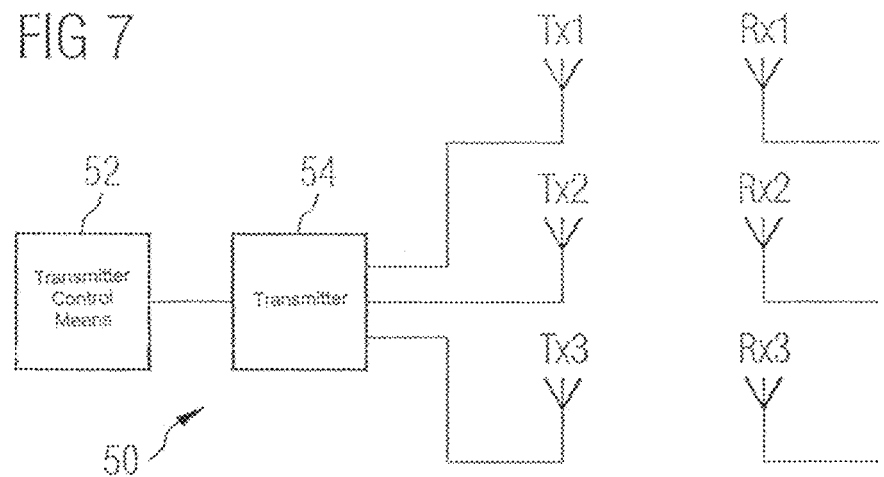
FIG. 7 is a block diagram of a first embodiment of a transmitter according to the present invention.

In FIG. 7 there is disclosed a block diagram of a first embodiment of a transmitter 54 according to the present invention. The transmitter 54 is included in a transmission system 50. The transmission system 50 comprises a transmitting means 54 connected to three transmitting antennas Tx1, Tx2, Tx3, and to transmitter control means 52. The control means 52 controls said transmitting means 54 to initially transmit an initial training/quantity estimation sequence during an initial training/quantity estimation phase and subsequently transmit a sequence of data symbols such that the information rate of the data symbols is progressively increased. In FIG. 7 there is also disclosed three receiving antennas Rx1, Rx2, Rx3.

According to a preferred embodiment said transmitter is implemented in a multiple input multiple output (MIMO) transmission system, wherein the transmissions on each transmitting antenna during an initial training/quantity estimation phase are separated in frequency, so that a given transmitting antenna is the only one transmitting on a given subcarrier at a given time.

Figure 8:
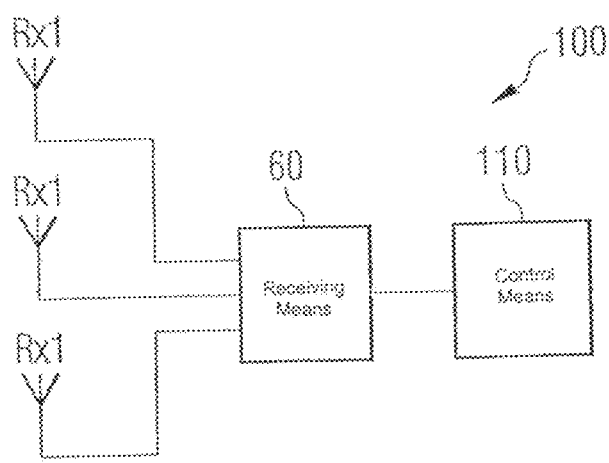
FIG. 8 is a block diagram of a first embodiment of an optimization system according to the present invention.

In FIG. 8 there is disclosed a block diagram of a first embodiment of an optimization system 100 according to the present invention. The optimization system 100 is operable to optimize estimates of a quantity at a receiver for improved operation. The optimization system 100 comprises a receiving means 60 connected to a number of receiving antennas Rx1, Rx2, Rx3, and to receiver control means 110. The control means 110 controls the receiving means 60 to initially receive an initial training (quantity estimation sequence during an initial training/quantity estimation phase and subsequently receive a sequence of data symbols such that the information rate of the data symbols is progressively increased.

In FIG. 9 there is disclosed a block diagram of the optimization system 100 disclosed in FIG. 8 in more detail. The optimization system 100 comprises a first estimating means 102 operable to make an initial estimate of said quantity, based on the received symbols during an initial training/quantity estimate phase. The system 100 also comprises an estimate updating means 104 operable to store a current estimate of said quantity. The system 100 also comprises a decoding means 106 operable to decode the received symbols. The system 100 also comprises a remodulating means 108 connected to said decoding means 106 and said estimate updating means 104, wherein said remodulating means 108 is operable to duplicate the modulation function performed at the transmitter to generate estimates of the transmitted symbols. The system 100 also comprises a control means 110 connected to the decoding means 106 and the remodulating means 108. In FIG. 9 there is also disclosed a demodulating means 112 and an error correction means 114.

In a preferred embodiment the control means 110 is operable to compare the received symbols and the estimated transmitted symbols and to calculate an error vector, wherein said estimate updating means 104 updates said estimate of the quantity based on said error vector.

In a preferred embodiment the updating means 104 updates said estimate of said quantity by using an RLS algorithm.

According to another embodiment the updating means 104 updates said estimate of said quantity by using an LMS algorithm.

The quantity can be one of a channel transfer function from a transmitting antenna to a receiving antenna, a frequency offset, a timing offset, sampling rate offset or a measure of the spatial position of the transmitter.

In a preferred embodiment the optimization system is implemented in a multiple input multiple output (MIMO) transmission system comprising m number of transmitting antennae and n number of receiving antennae, wherein m and n are integers and m, n≥2, wherein the transmissions on each transmitting antenna during an initial training/quantity estimation phase are separated in frequency, so that a given transmitting antenna is the only one transmitting on a given subcarrier at a given time.

In FIG. 10 there is disclosed a flow chart of a first embodiment of a method at a transmitter according to the present invention. The method allows for optimization of estimates of a quantity at a receiver. The method begins at block 140. The method continues, at block 142, with the transmission of an initial training/quantity estimation sequence. Thereafter the method continues, at block 144, with the transmission of the first few data symbols of the remainder of the transmission at a low information rate and an increase in the information transmission rate progressively with time. The method is completed at block 146.

In a preferred embodiment the above method also comprises deciding upon in advance and signalling the manner in which the information rate is to be changed, by using an agreed upon or predetermined encoding during the initial training/quantity estimation sequence.

In a preferred embodiment the transmission system is a backward-compatible multiple input multiple output (MIMO) transmission system comprising m number of transmitting antennas and n number of receiving antennas, wherein m and n are integers and m, n≥2. In the above exemplary system, the transmissions on each transmitting antenna are separated in frequency during the initial training/quantity estimation phase, so that a given transmitting antenna is the only one transmitting on a given subcarrier at a given time.

In FIG. 11 there is disclosed a flow chart of a first embodiment of a method for optimization according to the present invention. The exemplary method comprises optimising estimates of a quantity at a receiver. The method begins at block 150, and continues, at block 152, with the receiving of an initial training/quantity estimation sequence during an initial training/quantity estimation phase. Thereafter, the method continues, at block 154, with the adapting of the receiver to an increasing information rate used at the transmitter. The method is completed at block 156.

In a preferred embodiment the above method also comprises making an initial estimate of the quantity, based on the received symbols during the initial training/quantity estimating phase, and storing a current estimate of the quantity. The current quantity estimate is then decoded. A data symbol is received and also decoded and a duplication of the modulation function performed at the transmitter is performed, and is used to update the quantity estimate.

In another embodiment of the method, the received symbols and the transmitted symbols are compared and the comparison is employed to calculate an error vector. The error vector is then used to update the quantity estimate.

In another embodiment the method comprises updating the quantity estimates by using an RLS algorithm or an LMS algorithm.

In yet another embodiment, the method also comprises using an agreed upon or predetermined encoding technique received during the initial training/quantity estimation sequence to determine the manner in which the receiver is to be adapted to a changing information rate.

In one embodiment the quantity comprises a channel transfer function from a transmitting antenna to a receiving antenna.

Alternatively, the quantity may comprise a frequency offset, a timing offset, a sampling rate offset, or the spatial position of a transmitter.

In one exemplary embodiment the transmission system is a backward-compatible multiple input multiple output (MIMO) transmission systems comprising m number of transmitting antennas and n number of receiving antennas, wherein m and n are integers and m, n≥2. In the system, the transmissions on each transmitting antenna are separated in frequency during the initial training/quantity estimation phase, so that a given transmitting antenna is the only one transmitting on a given subcarrier at a given time.

In FIG. 12 a flow chart of the method disclosed in FIG. 11 is illustrated in more detail. The method begins at block 120. The method continues, at block 122, with a separating of the transmissions on each transmitting antenna in frequency during an initial training/quantity estimation phase, so that a given transmitting antenna is the only one transmitting on a given subcarrier at a given time. Thereafter, the method continues, at block 124, with the making of an initial estimate of the quantity, based on the received symbols during the initial training/quantity estimating phase. The method continues, at block 126, with a storing of a current estimate of the quantity. Thereafter the method continues, at block 128, with the decoding of the current quantity estimate. The method continues, at block 130, with the duplicating of the modulation function performed at the transmitter. Thereafter the method continues, at block 132, with transmitting the first few data symbols at a low transmission rate. The method continues, at block 134, with increasing the transmission rate progressively with time. The method is completed at block 136.

In FIG. 13 a block diagram illustrates a exemplary second embodiment of a transmitter 252 according to the present invention. The transmitter 252 in a transmission system 250 is operable to optimize estimates of a channel transfer function at a receiver for improved operation for backward-compatible multiple input multiple output (MIMO) OFDM-based wireless LAN networks. For example, MIMO networks that comprise m numbers of transmitting antennas Tx1-Txm, and n number of receiving antennas, wherein m an n are integers and m, n≥2. The transmission system 250 comprises a transmitting means 252 connected to a number of antenna means Tx1-Txm. The transmission system 250 connected to the transmitting means 252 is operable to control the transmissions in such a way that a different assignment of subcarriers to the transmitting antenna is made for later portions of the training/estimation sequence than for the initial portion of the training/estimation sequence containing the 11a/11g SIGNAL field.

In one embodiment, the control means 254 controls the transmissions in such a way that the mapping of subcarriers to the transmit antennas follows a predetermined sequence known at the receiver.

In another embodiment the control means 254 controls the transmissions in such a way that the mapping of subcarriers to transmit antennas optimizes the possibility for the receiver to estimate the channel transfer functions.

In FIG. 14 a block diagram is provided that illustrates a second embodiment of an optimization system 300 according to the present invention.

The optimization system 300 is operable to optimize estimates of a channel transfer function at a receiver for improved operation for backward-compatible multiple input multiple output (MIMO) OFDM-based wireless LAN networks. For example, MIMO networks that comprise m number of transmitting antennas and n number of receiving antennas, wherein m and n are integers and m, n≥2, and wherein the transmissions on each transmitting antenna during an initial training/channel estimating phase are separated in frequency, so that a given transmitting antenna is the only one transmitting on a given subcarrier at a given time.

The optimization system 300 comprises a receiving means 350 connected to receiving antennas Rx1, Rx2, Rx3, and to control means 310. The control means 310 is operable to adapt an estimate updating process to a different subcarrier to transmit antenna mapping during later portions of the training/estimation sequence than for the initial portion of the training/estimation sequence containing the 11a/11g SIGNAL field.

Figure 15:
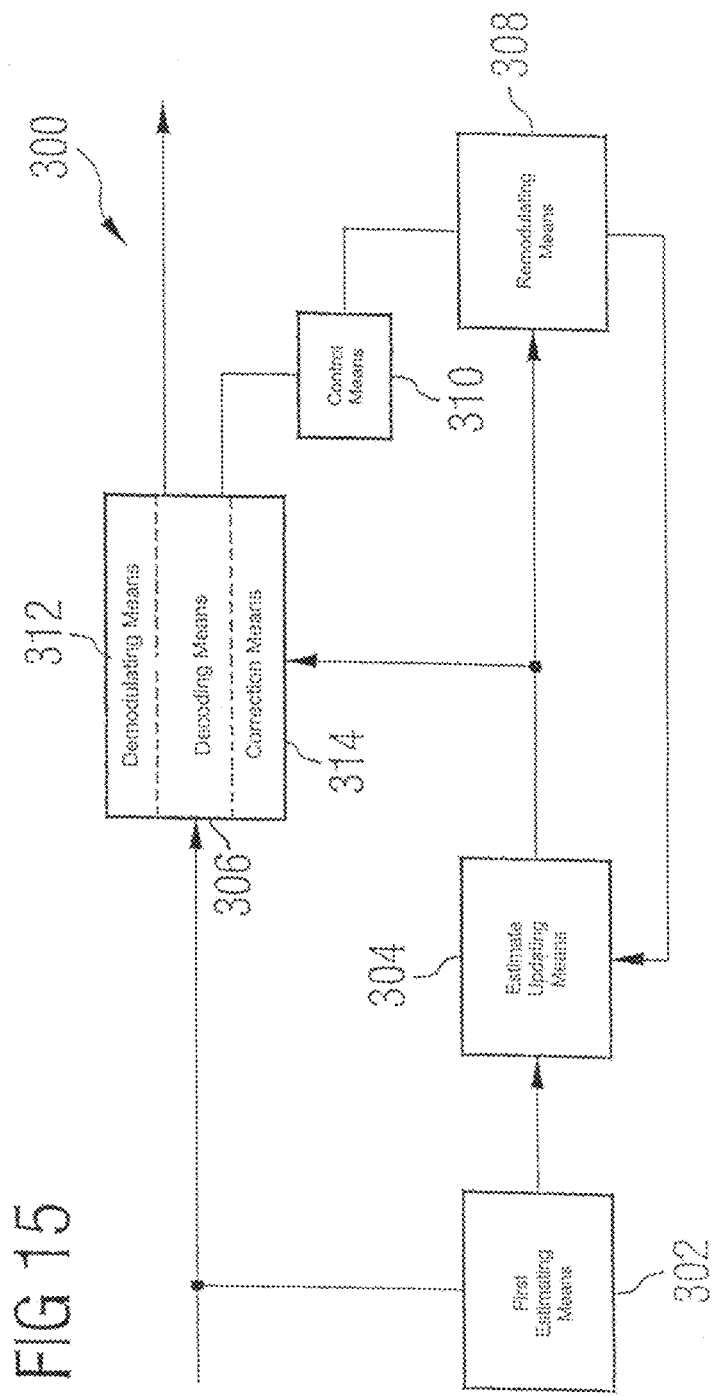
FIG. 15 is a block diagram of the optimization system disclosed in FIG. 14 in more detail.

In one exemplary embodiment the optimization system 300, see FIG. 15, comprises a first estimating means 302 operable to make an initial estimate of the channel transfer function, based on the received symbols during the initial portion of the training/channel estimation phase. In addition, an estimate updating means 304 is operable to update the estimate of the channel transfer function during the training/channel estimation phase. The estimate updating means 304 is connected to the decoding means 306 which is operable to decode the received symbols. The optimization system 300 also comprises a remodulating means 308 connected to the decoding means 306 and the estimate updating means 304. The remodulating means 308 is operable to duplicate the modulation function performed at the transmitter, wherein that control means 310 also is connected to the decoding means 306 and the remodulating means 308.

In one embodiment the control means 310 controls the estimate updating process in such a way that the mapping of subcarriers to transmit antennas follows a predetermined sequence used at the transmitter.

In another embodiment the control means 310 controls the estimate updating process in such a way as to optimize the estimate of the channel transfer functions.

In one embodiment the optimization system 300 also comprises a demodulating means 312 connected to the estimate updating means 304 and to the decoding means 306, wherein the demodulating means 312 is operable to demodulate the received symbols.

In another embodiment the optimization system 300 also comprises a correction means 314 connected to the decoding means 305, wherein the correction means 314 is operable to perform an error correction on the decoded symbols.

In FIG. 16 a flow chart is provided, illustrating a second embodiment of a method at a transmitter according to the present invention. The method at a transmitter is for optimising estimates of channel transfer functions at a receiver for improved operation for backward-compatible multiple input multiple output (MIMO) OFDM-based wireless LAN networks, for example, networks comprising m number of transmitting antennas and n number of receiving antennas, wherein m an n are integers and m, n≥2. The method begins at block 360, and continues at block 362, with separating the transmissions on each transmitting antenna in frequency during an initial training/channel estimation phase, so that only a single given antenna is transmitting on a given subcarrier at a given time. Thereafter, the method continues, at block 364, with the application of a different assignment of subcarriers to the transmitting antennas for the later portions of the training/channel estimation sequence than for the initial portion containing the 11a/11g SIGNAL field.

In one embodiment the method comprises controlling the transmissions in such a way that the mapping of subcarriers to the transmit antennas follows a predetermined sequence known at the receiver.

In another embodiment the method also comprises controlling the transmissions in such a way that the mapping of subcarriers to the transmit antennas optimizes the possibility for the receiver to estimate the channel transfer functions.

In FIG. 17 a flow chart is provided illustrating a second exemplary embodiment of a method for optimising according the present invention. A method is provided for optimising estimates of channel transfer functions at a receiver for improved operation for backward-compatible multiple input multiple output (MIMO) OFDM-based wireless LAN networks, comprising m number of transmitting antennas and n number of receiving antennas, wherein m and n are integers and m, n≥2. The method begins at block 320, and continues at block 322, with the receiving of an initial portion of the training/estimation sequence containing the 11a/11g SIGNAL field. Thereafter, the method continues, at block 324, with obtaining an initial estimate of the channel transfer function during the initial portion of the training/estimation sequence containing the 11a/11g SIGNAL field. The method continues, at block 326, with receiving a subsequent portion of the training/estimation sequence where the mapping of subcarriers to the transmit antennas is changed. Thereafter, the method continues, at block 328, with an updating of the initial estimate of the channel transfer function. The method is completed at block 330.

In one exemplary embodiment the method comprises controlling the updating of the channel transfer function estimates based on a predetermined sequence of mappings of subcarriers to the transmit antennae known to be used at the transmitter.

In another embodiment the method comprises demodulating the received symbols.

In another embodiment the method comprises performing an error correction on the decoded symbols.

In FIG. 18 a block diagram is disclosed illustrating a third exemplary embodiment of a transmitter 450 according to the present invention. The transmitter 450 in a transmission system 460 is operable to optimize estimates of channel transfers functions at a receiver for improved operation for backward-compatible multiple input multiple output (MIMO) OFDM-based wireless LAN networks. For example, MIMO networks comprising m numbers of transmitting antennas and n numbers of receiving antennas, wherein m and n are integers and m, n≥2. The transmission system 460 comprises a transmission means 450 capable of transmitting on a number of antennas Tx1-Txm, and a control means 452 operable to control transmissions in such a way that the subcarriers used for a pilot tone transmission is changed from symbol to symbol.

In one embodiment the control means 452 is further operable to decide in advance the pattern of which subcarriers and/or transmitting antennas are used for the pilot tones in each symbol.

In another embodiment the control means 452 also is operable to transmit known pilot tones on combinations of transmitting antenna Tx1-Txm and on subcarriers that have not been used during the initial training/channel estimating phase.

In FIG. 19 a block diagram is provided that discloses a receiver 400 according to another embodiment of the present invention. The receiver 400 in a transmission system 460 is operable to optimize estimates of channel transfer functions at the receiver for improved operation for backward-compatible multiple input multiple output (MIMO) OFDM-based wireless LAN networks, comprising m number of transmitting antennas and n number of receiving antennas, wherein m and n are integers and m, n≥2. The receiver 400 comprises a first estimating means 402 operable to make an initial estimate of the channel transfer function, based on the received symbols during an initial training/channel estimation phase. The receiver 400 also comprises an estimate updating means 404 operable to update the estimate of the channel transfer function, which is operably coupled to a remodulating means 406 operable to duplicate the modulation function performed at the transmitter. The receiver 400 also comprises a pilot measuring means 408 and a control means 410 connected to the pilot measuring means 408, the estimate updating means 404, and the remodulating means 406. The control means 410 is operable to control the pilot measuring means such that the subcarriers used for a pilot tone reception is changed from symbol to symbol.

In another embodiment, the control means 410 is also operable to decide in advance the pattern of which subcarriers and/or transmitting antennas are used for pilot tones in each symbol.

In FIG. 20 a flow chart is provided, illustrating an exemplary third embodiment of a method at a transmitter according to the present invention. The method operates at a transmitter for allowing optimized estimates of channel transfer functions at a receiver for improved operation for backward-compatible multiple input multiple output (MIMO) OFDM-based wireless LAN networks, comprising m number of transmitting antennas and n number of receiving antennas, wherein m and n are integers and m, n≥2. The method begins at block 470, and continues at block 472, with transmitting an initial training/channel estimating sequence during an initial training/channel estimation phase. Thereafter the method continues, at block 474, with controlling transmissions in subsequent data symbols in such a way that the subcarriers used for a pilot tone transmission are changed from symbol to symbol. The method is completed at block 476.

In one embodiment the method also comprises deciding in advance the pattern of which subcarriers and/or transmitting antennas are used for pilot tones in each symbol.

In another embodiment the method also comprises transmitting known pilot tones on combinations of transmitting antenna and subcarriers that not have been used during the initial training/channel estimating phase.

In FIG. 21 a flow chart is provided that illustrates a method at a receiver according to another embodiment of the present invention. The method at a receiver for producing optimized estimates of channel transfer functions for improved operation in a multiple input multiple output (MIMO) OFDM-based wireless LAN network, for example, a network comprising m number of transmitting antennas and n number of receiving antennas, wherein m and n are integers and m, n≥2. The method begins at block 500, and continues, at block 502, with making an initial estimate of the channel transfer function, based on the received symbols during the initial training/channel estimating phase. Thereafter, the method continues, at block 504, with receiving the transmitted pilot tones from the subcarriers used at the transmitter. The method continues, at block 506, with duplicating the modulation function performed at the transmitter. Thereafter, the method continues, at block 508, with updating the estimate of the channel transfer function using the received pilot tones. The method is completed at block 510.

In FIG. 22 a flow chart is disclosed, illustrating the method disclosed of FIG. 21 in greater detail. The method begins at block 420, and continues at blocks 422-430. The method comprises separating the transmissions on each transmitting antenna in frequency during an initial training/channel estimating phase, so that a given transmitting antenna is the only one transmitting on a given subcarrier at a time. An initial estimate of the channel transfer function is then made, based on the received symbols during the initial training/channel estimating phase. The estimate of the channel transfer function is updated, and the modulation function performed at the transmitter is duplicated. Transmissions are then controlled in such a way that the subcarriers used for a pilot tone transmission is changed from symbol to symbol. The method is completed at block 432.

Figure 23:
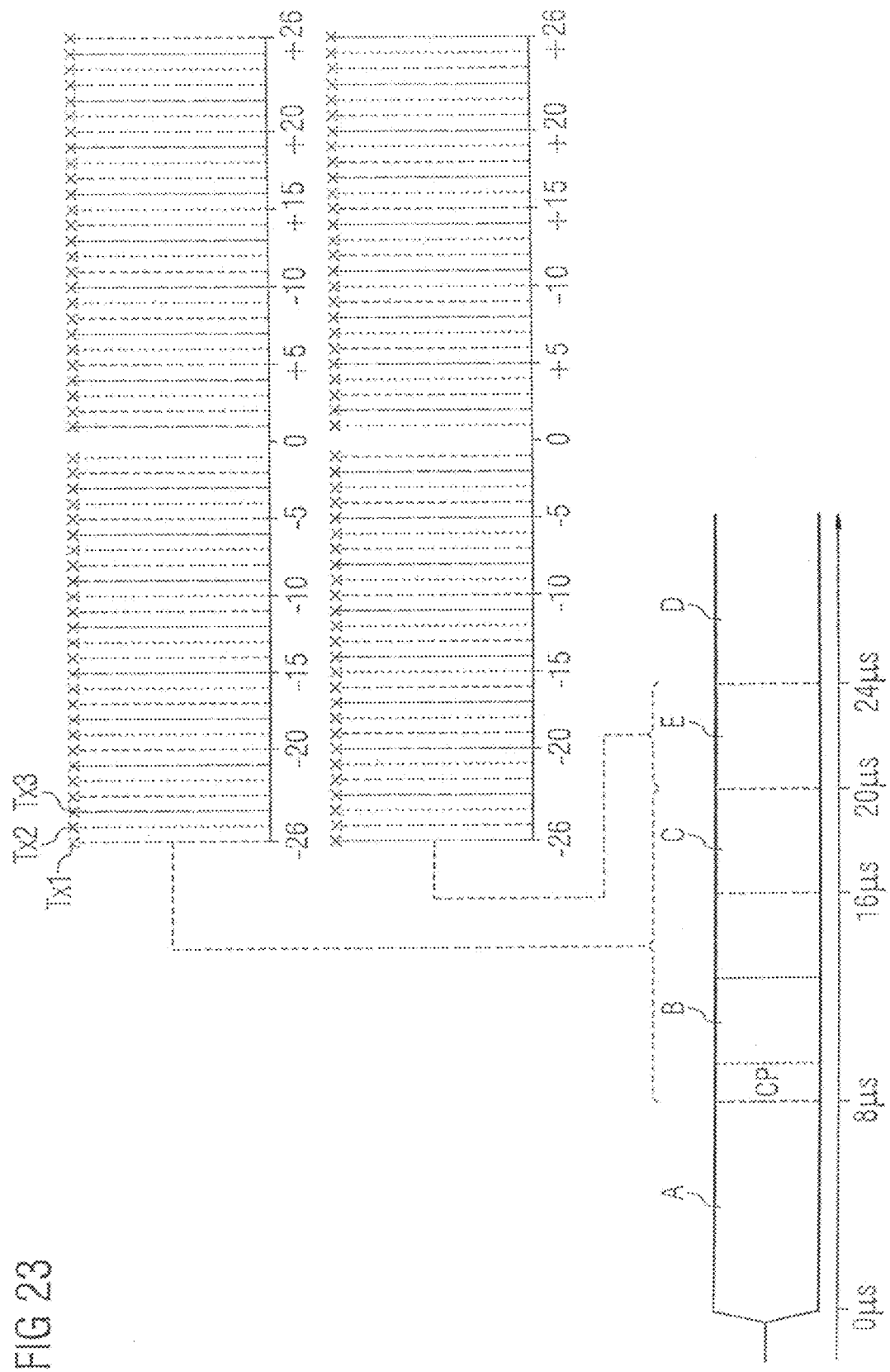
FIG. 23 shows the change of subcarrier/Tx antenna allocation for the SIGNAL2 field.

In FIG. 23 the change of subcarrier/Tx antenna allocation for the SIGNAL2 field is disclosed.

Typically, the SIGNAL2 field will be transmitted using one of the more robust modulation formats (for example, the most robust mode). Since a significant amount of data is already encoded in the 11a/11g SIGNAL field, it is unlikely that a large amount of information would be encoded in the SIGNAL2 field, thereby allowing such a robust, low data rate format. Since the data, in one example, is transmitted using the most robust encoding, data-based estimates of the channel transfer function are most likely to be reliable. Thus, the SIGNAL2 field can be treated in some respects as an extension of the preamble before more complex modulation formats are applied to the remainder of the data section. According to the invention, a different assignment of subcarriers to the transmit antennae is made for the SIGNAL2 field, as shown in FIG. 23. This allows another set of channel transfer functions to be directly estimated without the need for interpolation or extrapolation. It may be the case, in one embodiment, that the number of bits required to be transmitted in the SIGNAL2 field do not require the use of all of the available subcarriers. In this case, it is advantageous to transmit a known value on the remaining subcarriers. This allows a non data-dependent estimate of the channel transfer function on those subcarriers. It is particularly advantageous if the subcarriers at the band edge (e.g., subcarrier numbers −26, +26) are assigned with known values, since these are the values which will have the greatest error in the channel transfer function estimates and for which data-directed estimation is most likely to fail.

The above may pertain to the various embodiments of the invention disclosed in FIGS. 13-17, for example.

In FIG. 24 a schematic diagram of some computer program products according to the present invention is provided. There is disclosed n different digital computers $200_1, \ldots, 200_n$, wherein n is an integer. There is also disclosed n different computer program products $202_1, \ldots, 202_n$, here showed in the form of compact discs, for example. The different computer program products $202_1, \ldots, 202_n$ are directly loadable into the internal memory of the n different digital computers $200_1, \ldots, 200_n$. Each computer program product $202_1, \ldots, 202_n$ comprises software code portions for performing some or all the steps of all the steps of FIG. 10, 11, 12, 16, 17, 20, 21 or 22 when the product(s) $202_1, \ldots, 202_n$ is/are run on said computer(s) $200_1, \ldots, 200_n$ or other type controller. Said computer program products $202_1, \ldots, 202_n$ can, for example, be in the form of floppy disks, RAM disks, magnetic tapes, opto magnetical disks or any other suitable products.

Although the invention has been illustrated and described with respect to one or more implementations, alterations and/or modifications may be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

The invention claimed is:

1. A transmission system including a transmitter operable to optimize estimates of a quantity at a receiver for improved operation, comprising:
a transmitting means operably coupled to a plurality of antennas (Txm); and
a control means operably coupled to the transmitting means, wherein the control means is configured to control the transmitting means to transmit an initial training/quantity estimation sequence of a data packet during an initial training/quantity estimation phase and subsequently transmit a sequence of data symbols of the data packet such that the information rate of the data symbols is progressively increased, during the transmission of the data symbols; wherein a first part of the sequence of data symbols is transmitted using a first data rate and a second part of the sequence of data symbols is transmitted using a second data rate with the second data rate being higher than the first data rate.

2. The transmission system of claim 1, wherein the transmission system comprises a multiple input multiple output (MIMO) transmission system comprising m number of transmitting antennae (Txm) and n number of receiving antennae (Rxn), wherein m and n are integers and m, n 2, and wherein the transmission means is operable to transmit an initial training/quantity estimation sequence on each transmitting antenna during an initial training/quantity estimation phase that are separated in frequency from one another, so that a given transmitting antenna is the only one transmitting on a given subcarrier at a given time.

3. An optimization system operable to generate estimates of a quantity at a receiver for improved operation in a communications system, comprising:
a receiving means operably coupled to a plurality of receiving antennas (Rxn) configured to receive transmissions thereat; and
a control means operably coupled to the receiving means and configured to control the receiving means to initially receive an initial training/quantity estimation sequence of a data packet comprising training symbols during an initial training/quantity estimation phase and subsequently receive a sequence of data symbols of the data packet such that the information rate of the data symbols is progressively increased, during the transmission of the data symbols; wherein a first part of the sequence of data symbols is received at a first data rate and a second part of the sequence of data symbols is received at a second data rate with the second data rate being higher than the first data rate.

4. The optimization system of claim 3, further comprising:
a first estimating means operable to make an initial estimate of the quantity, based on the received symbols during the initial training/quantity estimation phase;
estimate updating means operable to store a current estimate of the quantity from the first estimating means;
decoding means operable to decode the received symbols;
remodulating means operably coupled to the decoding means and the estimate updating means, and operable to duplicate a modulation function performed at a transmitter associated therewith to generate estimated transmitted symbols;
control means connected to the decoding means and the remodulating means, wherein the control means operable to compare the received symbols and the estimated transmitted symbols and to calculate an error vector, and wherein the estimate updating mean updates the estimate of the quantity based on the error vector.

5. The optimization system of claim 3, wherein the quantity comprises a channel transfer function from a transmitting antenna to a receiving antenna, a frequency offset, a timing offset, a sampling rate offset, or a spatial position of the transmitter.

6. The optimization system of claim 3, wherein the optimization system is implemented in a multiple input multiple output (MIMO) transmission system comprising m number of transmitting antennae and n number of receiving antennae, wherein m and n are integers and m, n≥2, wherein the transmissions on each transmitting antenna during an initial training/quantity estimation phase are separated in frequency, so that a given transmitting antenna is the only one transmitting on a given subcarrier at a given time.

7. A method at a transmitter to facilitate an optimization of estimates of a quantity at a receiver in a communications system, comprising:
transmitting an initial training/quantity estimation sequence of a data packet comprising training symbols to the receiver; and
transmitting a first few data symbols of the data packet to the receiver at a low information rate and increasing the information rate progressively with time during transmission of a sequence of data symbols of the data packet;
wherein a first part of the sequence of data symbols is transmitting using a first data rate and a second part of the sequence of data symbols is transmitted using a second data rate with the second data rate being higher than the first data rate.

8. The method of claim 7, further comprising:
deciding upon in advance and signalling a manner in which the information rate is to be changed during the data symbol transmission, by using a predetermined encoding of symbols during the initial training/quantity estimation sequence transmission.

9. The method of claim 7, wherein the communications system comprises a backward-compatible multiple input multiple output (MIMO) transmission system comprising m number of transmitting antennas and n number of receiving antennas, wherein m and n are integers and m, n 2, that the transmissions on each transmitting antenna are separated in frequency during the initial training/quantity estimation phase, so that a given transmitting antenna is the only one transmitting on a given subcarrier at a given time.

10. A method for optimization of estimates of a quantity at a receiver in a communications system, comprising:
- receiving an initial training/quantity estimation sequence of a data packet comprising training symbols during an initial training/quantity estimation phase; and
- adapting the receiver to an increasing information rate used at the transmitter after the training symbols during a transmission of a sequence of data symbols of the data packet;
- wherein a first part of the sequence of data symbols is transmitted using a first data rate and a second part of the sequence of data symbols is transmitted using a second data rate with the second data rate being higher than the first data rate.

11. The method of claim 10, further comprising:
- making an initial estimate of the quantity, based on the received training symbols during the initial training/quantity estimating phase;
- storing a current estimate of the quantity;
- decoding the current estimate of the quantity;
- receiving a data symbol and decoding the data symbol;
- comparing the decoded data symbols and the decoded quantity estimates;
- calculating an error vector based on the comparison; and
- updating the quantity estimate based on the error vector.

12. The method of claim 10, further comprising using a predetermined encoding of the training symbols received during the initial training/quantity estimation sequence transmission to determine a manner in which the receiver is to be adapted to a changing information rate during the subsequent data symbol transmission.

13. The method of claim 10, wherein the quantity comprises a channel transfer function from a transmitting antenna to a receiving antenna, a frequency offset, a timing offset, a sampling rate offset, or a spatial position of a transmitter.

14. The method of claim 10, wherein the communications system comprises a backward-compatible multiple input multiple output (MIMO) transmission systems comprising m number of transmitting antennas and n number of receiving antennas, wherein m and n are integers and m, n 2, that the transmissions on each transmitting antenna are separated in frequency during the initial training/quantity estimation phase, so that a given transmitting antenna is the only one transmitting on a given subcarrier at a given time.

* * * * *

UNITED STATES PATENT AND TRADEMARK OFFICE
CERTIFICATE OF CORRECTION

| | | Page 1 of 1 |
|---|---|---|
| PATENT NO. | : 8,958,493 B2 | |
| APPLICATION NO. | : 11/089284 | |
| DATED | : February 17, 2015 | |
| INVENTOR(S) | : Lewis | |

It is certified that error appears in the above-identified patent and that said Letters Patent is hereby corrected as shown below:

In the Claims

Column 15, Claim 2, Line 51 delete "...integers and m, n 2, and wherein" insert --... integers and m, $n \geq 2$, and wherein--

Column 16, Claim 9, Line 67 delete "...integers and m, n 2, that the" insert --... integers and m, $n \geq 2$, that the--

Column 18, Claim 14, Line 19 delete "...integers and m, n 2, that the" insert --... integers and m, $n \geq 2$, that the--

Signed and Sealed this
Ninth Day of June, 2015

Michelle K. Lee
*Director of the United States Patent and Trademark Office*